United States Patent [19]
Frank et al.

[11] Patent Number: 5,470,366
[45] Date of Patent: Nov. 28, 1995

[54] METHOD AND APPARATUS FOR PROCESSING A GLASS SHEET

[75] Inventors: Robert G. Frank, Sarver; James H. Schwartz, Gibsonia, both of Pa.

[73] Assignee: PPG Industries, Inc., Pittsburgh, Pa.

[21] Appl. No.: 178,978

[22] Filed: Jan. 7, 1994

[51] Int. Cl.$^6$ .............................................. C03B 23/023
[52] U.S. Cl. ................... 65/104; 65/106; 65/165; 65/268; 65/273
[58] Field of Search ................... 65/27, 28, 104, 65/106, 165, 268, 273

[56] References Cited

U.S. PATENT DOCUMENTS 4,830,650  5/1989  Kelly ........................................ 65/106
5,069,704  12/1991  Bontier et al. .......................... 65/106

*Primary Examiner*—Karen M. Hastings
*Assistant Examiner*—Steven P. Griffin
*Attorney, Agent, or Firm*—Andrew C. Siminerio

[57] ABSTRACT

The present invention provides a glass sheet shaping arrangement whereby a glass sheet may be conveyed through a shaping station without being shaped and deposited into a glass collector beneath an upstream portion of the adjacent quench without impacting the lower quench or interfering with the operation of the quench. A furnace, shaping station and cooling station are all linearly aligned so that a glass sheet progresses through the glass sheet shaping arrangement without changing its advancing direction. A glass sheet is conveyed in a first direction along a first generally horizontal plane through the furnace to heat the sheet to its heat softening temperature. The sheet continues into the shaping station where it is lifted into engagement with an upper vacuum surface. A ring member moves along a second generally horizontal plane in a direction which is linearly aligned with the first direction, from a first position between an upper and lower quench in the cooling station to a second position within the shaping station beneath the upper vacuum surface. Vacuum is terminated along the upper surface, depositing the sheet on the ring. The shaped sheet is cooled by moving the ring from the second position within the shaping station along the second plane to the first position within the cooling station. The second plane is vertically offset relative to the first plane such that the first plane is beneath a portion of the lower quench which is immediately adjacent the shaping station. With this arrangement, the glass sheets may be conveyed through the shaping station and into the collector without interfering with any further production.

15 Claims, 3 Drawing Sheets

METHOD AND APPARATUS FOR PROCESSING A GLASS SHEET

BACKGROUND OF THE INVENTION

The present invention relates to shaping heat softened glass sheets at a shaping station and transferring them to a cooling station and in particular, to an arrangement to bypass a cooling station without upsetting the continuous flow of glass sheets through a glass sheet processing line.

In one method of shaping a glass sheet to a contoured configuration, the sheet is heated and engaged by an upper mold having the desired shape of the glass. The shaping may be supplemented by a complimenting lower mold that lifts and presses the glass sheet against the upper mold. After shaping, the glass sheet is transferred to a cooling station where the glass is rapidly cooled by applying air blasts against the opposing major surfaces of the sheet. This transfer of the glass may be accomplished by depositing the shaped sheet onto a contoured support ring of a type well known in the art, which moves between the shaping station and the cooling station.

In processing a series of glass sheets, problems may arise that adversely affect the operation of the entire line. More specifically, problems such as broken glass sheets or non-functioning shaping molds must be dealt with immediately because of the continuous flow of heat softened glass sheets through the system. If the glass sheet flow is slow or stopped, glass sheets in the furnace may overheat and sag between or stick to the furnace conveyor rolls. In one common arrangement known in the art, the cooling station is positioned alongside the shaping station so that the glass sheets may pass directly through the shaping station and into a collection bin positioned at the exit end of the shaping station. However, in some situations the cooling station is preferably linearly aligned with the glass sheet heating furnace and shaping station. More particularly, aligning the cooling station with the furnace and shaping station allows the glass sheet to be shaped to travel with its short dimension oriented along the centerline of the furnace. This in turn allows for zone heating of the glass sheet across its width. In addition, orienting the sheet in the short direction reduces the time required for the sheet to pass from the furnace into the shaping station and from the shaping station into the cooling station. With this type of heating/shaping/cooling arrangement, if the glass sheet is allowed to pass through the shaping station without being shaped and transferred onto a support ring, it would impact the quenches in the cooling station resulting in broken glass which must be removed by an operator before the next glass sheet arrives. An operator may attempt to remove the hot glass sheet at the shaping station; however this provides a hazard to the operator because of the extremely high temperatures. In addition, if the glass sheet breaks in the shaping station, the glass fragments must be removed from the rolls and between the molds before the next glass sheet arrives.

It would be advantageous to provide an arrangement whereby glass may be unloaded from the line in the event of an operating problem without adversely affecting the serial flow of glass sheets through the line and without operator assistance.

SUMMARY OF THE INVENTION

The present invention provides a glass sheet shaping arrangement whereby a glass sheet may be conveyed through a shaping station without being shaped and deposited into a glass collector beneath an upstream portion of the adjacent quench without impacting the lower quench or interfering with the operation of the quench. More particularly, a furnace, shaping station and cooling station are all linearly aligned so that a glass sheet progresses through the glass sheet shaping arrangement without changing its advancing direction. A glass sheet is conveyed in a first direction along a first generally horizontal plane through the furnace to heat the sheet to its heat softening temperature. The sheet continues into the shaping station where it is lifted into engagement with an upper vacuum surface. A ring member moves along a second generally horizontal plane in a direction which is linearly aligned with the first direction, from a first position between an upper and lower quench in the cooling station to a second position within the shaping station beneath the upper vacuum surface. Vacuum is terminated along the upper surface, depositing the sheet on the ring. The shaped sheet is cooled by moving the ring from the second position within the shaping station along the second plane to the first position within the cooling station. In the present invention, the second plane is vertically offset relative to the first plane such that the first plane is beneath a portion of the lower quench which is immediately adjacent the shaping station. With this arrangement, the glass sheets may be conveyed through the shaping station and into the collector without interfering with any further production. This is particularly useful in the event the shaping operation or ring malfunctions, or if the glass sheet is misaligned when it reaches the shaping station, or all the glass sheets must be removed from the furnace without being shaped,.

DETAILED DESCRIPTION OF THE INVENTION

The present invention illustrates a glass sheet heating, shaping and cooling arrangement but it should be appreciated that the teachings may be used in shaping and cooling other sheet material.

Figure 1:
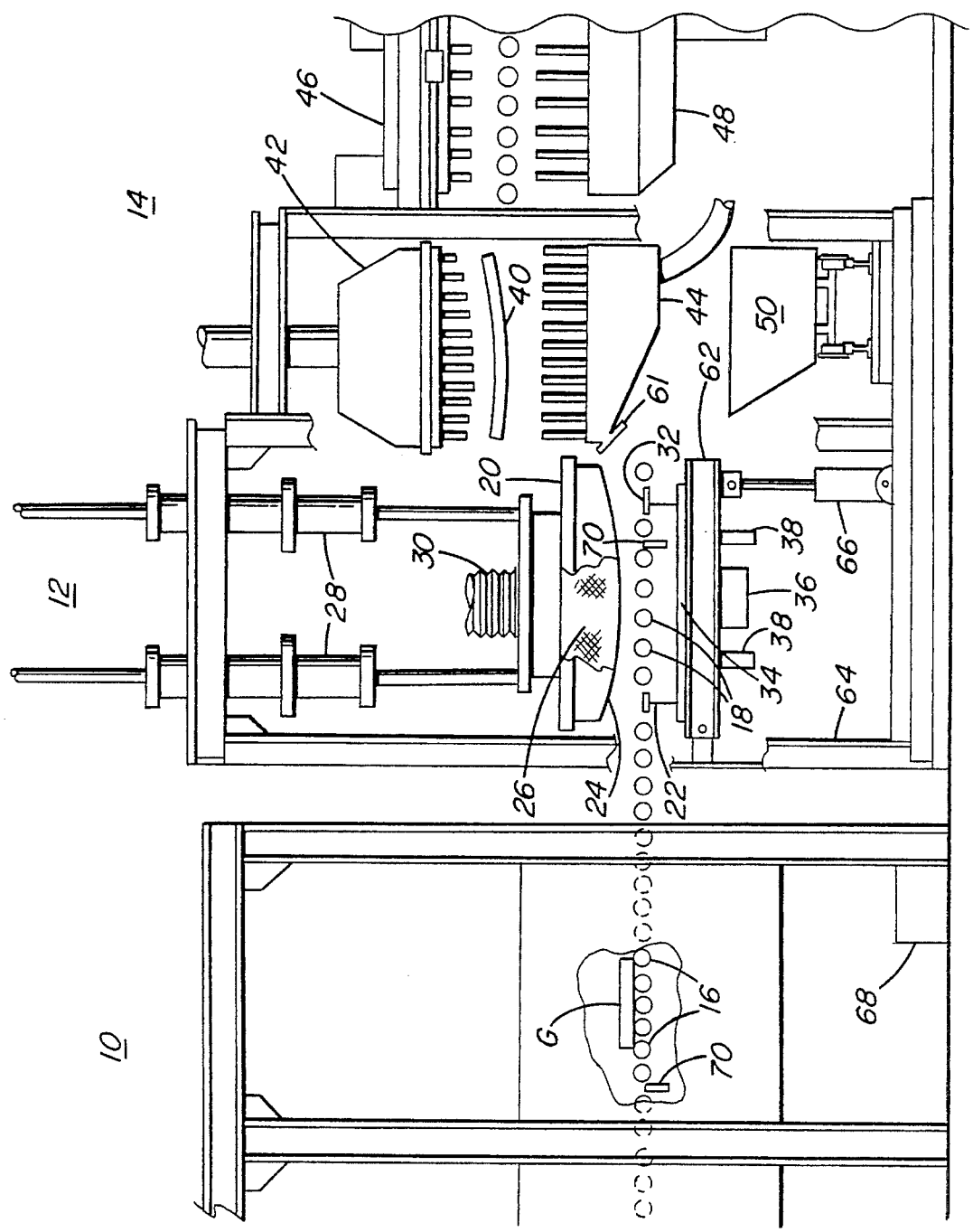
FIG. 1 is a schematic side elevation of a glass sheet heating, shaping and tempering line incorporating features of the present invention.

FIG. 1 illustrates a glass sheet heating, shaping and tempering layout including a furnace 10, shaping station 12 and cooling station 14. Glass sheets G are conveyed over roll 16 through furnace 10 where they are heated to their heat softening temperature, typically between 1050°–1200° F. (566°–649° C.). Each sheet G is then conveyed by roll 18 to a shaping station 12 where it is positioned between a pair of opposing shaping surfaces and pressed to shape. In the particular embodiment illustrated in FIG. 1, shaping is performed by an upper vacuum mold 20 and a lower ring mold 22 as disclosed in U.S. Pat. No. 4,830,650 to Kelly. Upper mold 20 includes a metal or ceramic press face 24 and if required, a heat resistant fabric covering 26. Cylinders 28 are used to vertically align and reciprocate mold 20 relative to lower mold 22. Vacuum is drawn via duct 30 through mold 20 and along press face 24 to help conform the glass sheet to be shaped to the surface configuration of press face 24 and to hold the glass sheet G thereagainst. Lower ring mold 22 includes a peripheral pressing surface 32 which is supported from press plate 34. Drive 36 lifts and lowers plate 34 and ring mold 22 to lift the glass sheet G into contact with face 24 of the upper mold 20. Alignment rods 38 maintain vertical alignment of ring mold 22 with mold 20. After the glass sheet G is pressed to shape between the molds, it is deposited onto a support ring 40 and transferred to the cooling station 14 where the sheet G is contacted by high velocity air streams between upper and lower quench 42 and 44 to temper the sheet.

As an alternative to using a vacuum mold 20 to shape the glass sheets G, mold 20 may be replaced with a flat vacuum pickup (not shown) which lifts the glass sheet and drops it onto a shaping ring, a process commonly known by those skilled in the art as drop forming. In addition, the lower ring 22 may be replaced by a plurality of lifters which assist in lifting the glass sheet G into engagement with surface 24 of upper mold 20.

Typically, each glass sheet G is conveyed along a first generally horizontal plane on rolls 16 through furnace 10 and on rolls 18 into shaping station 12 in a direction which is generally linearly aligned with the direction of movement of the shaped glass sheet G along a second generally horizontal plane through cooling station 14. During shaping, the glass sheet G is shaped against upper mold 20 and held against press face 24 by vacuum. Thereafter, mold 20 moves upward the minimum distance required to allow ring 40 to move from the cooling station 14 to a position beneath upper mold 20. When vacuum is terminated in mold 20, the shaped glass sheet G is dropped onto ring 40 which moves the sheet G into cooling station 14. In the present invention, the first and second horizontal planes are vertically offset a sufficient distance so that the glass sheet G may be conveyed through shaping station 12 without being shaped by molds 20 and 22 and out of exit end of station 12 without impacting any portion of the lower quench 44 or interfering with the operation of the cooling station 14. Referring to FIG. 1, quenches 42, 44, 46 and 48 in the cooling station 12 and the movement of the ring member 40 along the second horizontal plane is elevated relative to the plane of support provided by rolls 18 through shaping station 12, i.e. the first horizontal plane, so that the glass sheets G may run out through station 12 and into a glass collector. In the particular embodiment of the invention shown in FIGS. 1 and 4, the glass collector is a removable hopper 50 positioned below the quench 44. In this manner, broken, misaligned or otherwise defective glass sheets may be removed from the furnace 10 without any disruption of the continuous glass sheet heating, shaping and cooling operation. In addition, in the event the molds malfunction, the glass sheet G may be easily removed from the shaping station.

It should be appreciated that the glass collector could also be any other type of arrangement which collects and removes the glass sheets from the cooling station 14. For example, a chute arrangement (not shown) may be positioned below the quench 44 to receive the discharged glass sheets and direct them into a bin or conveyor system located on a floor below the heating, shaping and cooling equipment.

Based on the teachings of the present invention, it is clear that the amount of lift required of the upper mold 20 depends in part on the dimensions of the lower quench 44. The less the vertical movement required of the upper mold 20 to allow ring 40 to move beneath the mold 20 so that the glass sheet G may be deposited on ring 40 while at the same time providing adequate clearance under the quench 44, the lower the cycle time for the glass sheet G and therefore, the greater the throughput and production.

Figure 2:
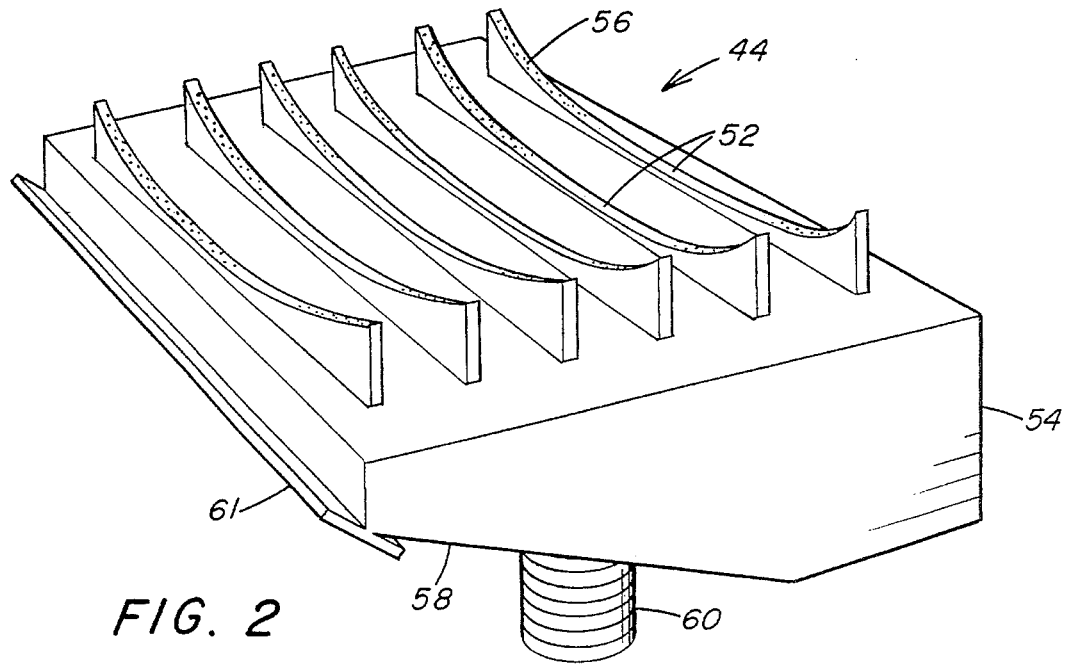
FIG. 2 is perspective view of a lower glass sheet quenching arrangement incorporating features of the present invention, with portions removed for clarity.

To this end, in an embodiment of the invention shown in FIGS. 1 and 2, lower quench 44 includes a plurality of nozzle bars 52 feed by a common plenum 54. Surface 56 of each nozzle bar 52 adjacent a major surface of the glass sheet to be tempered is provided with a curved configuration that generally corresponds to the adjacent glass sheet surface. Holes are provided from surface 56 through each bar 52 to provide a pathway for air from plenum 54 to the glass sheet G. As an alternative, nozzle bars 52 may be replaced with a plurality of individual nozzles (not shown) extending from plenum 54 toward the glass sheet to direct air at the glass.

Upstream portion 58 of lower quench 44 at the entry end of the cooling station 14 is provided with a low profile. More particularly, the depth of portion 58 of quench 44 is reduced to minimize the lift required by the upper mold 20 to lift the shaped glass G to the plane of movement of the ring 40 while providing adequate clearance for the glass sheet G beneath the quench 44 as the sheet is discharged from shaping station 12 without being shaped. With continued reference to FIG. 2, an air supply duct 60 is connected to the plenum 54 at a downstream end of the quench 44 to provide free and clear movement of the hopper 50 (shown in FIGS. 1 and 4) beneath the quench 44. As shown in FIGS. 1 and 2, upstream portion 58 is tapered to better distribute the air to nozzle bars 52. It should be appreciated that quench 44 may also be constructed to include a non-tapered plenum. Although such a configuration is contemplated to be within the scope of the present invention, it should be appreciated that such an arrangement may require additional vertical offset of the heating and shaping plane relative to the cooling plane to allow the glass sheet G to pass through the shaping station 12 and under the quench 44 and therefore add to the overall cycle time of the operation. In addition, a deflector plate 61 may be positioned in front of the lower quench 44 to further protect the quench from the hot glass sheets.

Figure 3:
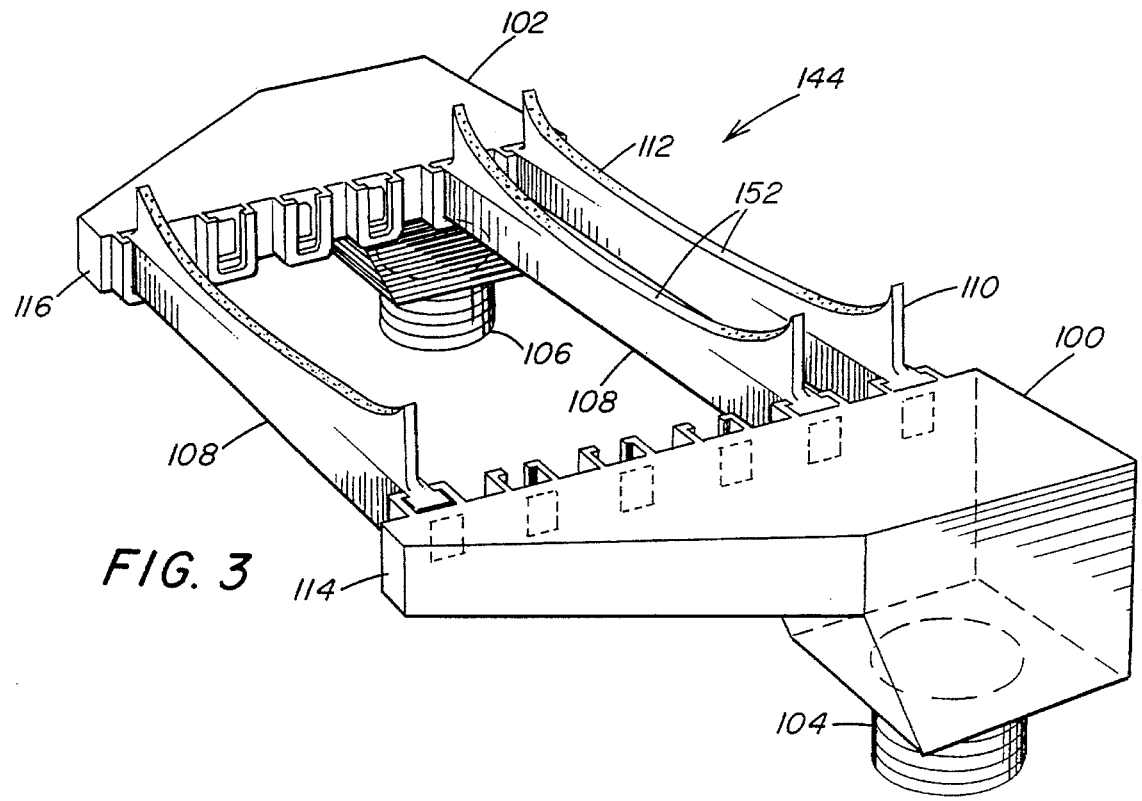
FIG. 3 is a view similar to FIG. 2 showing an alternate quench arrangement.

In an alternate quench embodiment illustrated in FIG. 3, quench 144 further eliminates the common plenum by providing two chambers 100 and 102 which are positioned to supply air to opposite ends of a plurality of longitudinally extending, spaced apart nozzle assemblies 152. Each of chambers 100 and 102 are positioned laterally outward from the nozzle assemblies 152 and are connected to an air supply duct 104 or 106, respectively. Assemblies 152 include an air supply conduit 108 which extends between and is connected to chambers 100 and 102 and a nozzle bar 110 having holes extending from surface 112 of nozzle bar 110 to conduit 108 to provide a pathway for air from chambers 100 and 102 to the glass sheet G to be cooled. Chambers 100 and 102 are configured to provide a minimum cross sectional profile at upstream ends 114 and 116. The depth of the upstream portions 114 and 116 of chambers 100 and 102 in the particular embodiment illustrated in FIG. 3 is kept constant although it could also be tapered as shown in the previous embodiment illustrated in FIG. 2. The tapered shape of the chambers 100 and 102 of the quench 144 provides uniform flow of air from supply ducts 104 and 106 to each nozzle bar 152 so that each bar 152 delivers approximately the same volume of air at the same velocity as adjacent bars 152. In addition, supplying air to both ends of bars 152 provides uniform flow across the bars 152. It is believed that the combination of tapered chambers and the end air supply provides uniform temper to the glass sheet G being cooled while reducing the overall size of chambers 100 and 102.

The elimination of the plenum from beneath the nozzle bars 152 provides additional advantages. First, since there is no structure beneath the glass sheet G to impede movement of the air supplied through the nozzle bars 152 of the lower quench 144, air escape is enhanced which in turn increases the uniformity of the temper. Second, if a hopper 50 is used to collect the gass sheeets G, the hopper may now be positioned at the entry end of the cooling station 14 without any interference from the quenches. This allows the quench structure to be lowered and reduce the lift required by the upper mold 20 to lift the glass sheet G to the plane of movement of ring 40 between the quenches 42 and 44. Third, in the event that a glass sheet fractures while within this portion of the quench 14, the glass fragments will fall between the individual nozzle assemblies 152 so that they may be removed without interfering will the operation of the quench 14.

It should be appreciated that regardless of the actual quench design, air flow must be matched between the upper and lower quenches to provide the required tempering characteristics and further so that the sheet G is not blown upward off the ring 40 by the lower nozzles 52, 152 supplied by lower quench 44, 144 or blown downward into the ring 40 from the upper nozzles supplied by upper quench 42.

The particular embodiments of the invention shown in FIGS. 2 and 3 show uniform tapers in the upstream portions of quenches 44 and 144; however these sections may be stepped or otherwise modified to get the desired air flow through the quench nozzles.

Figure 4:
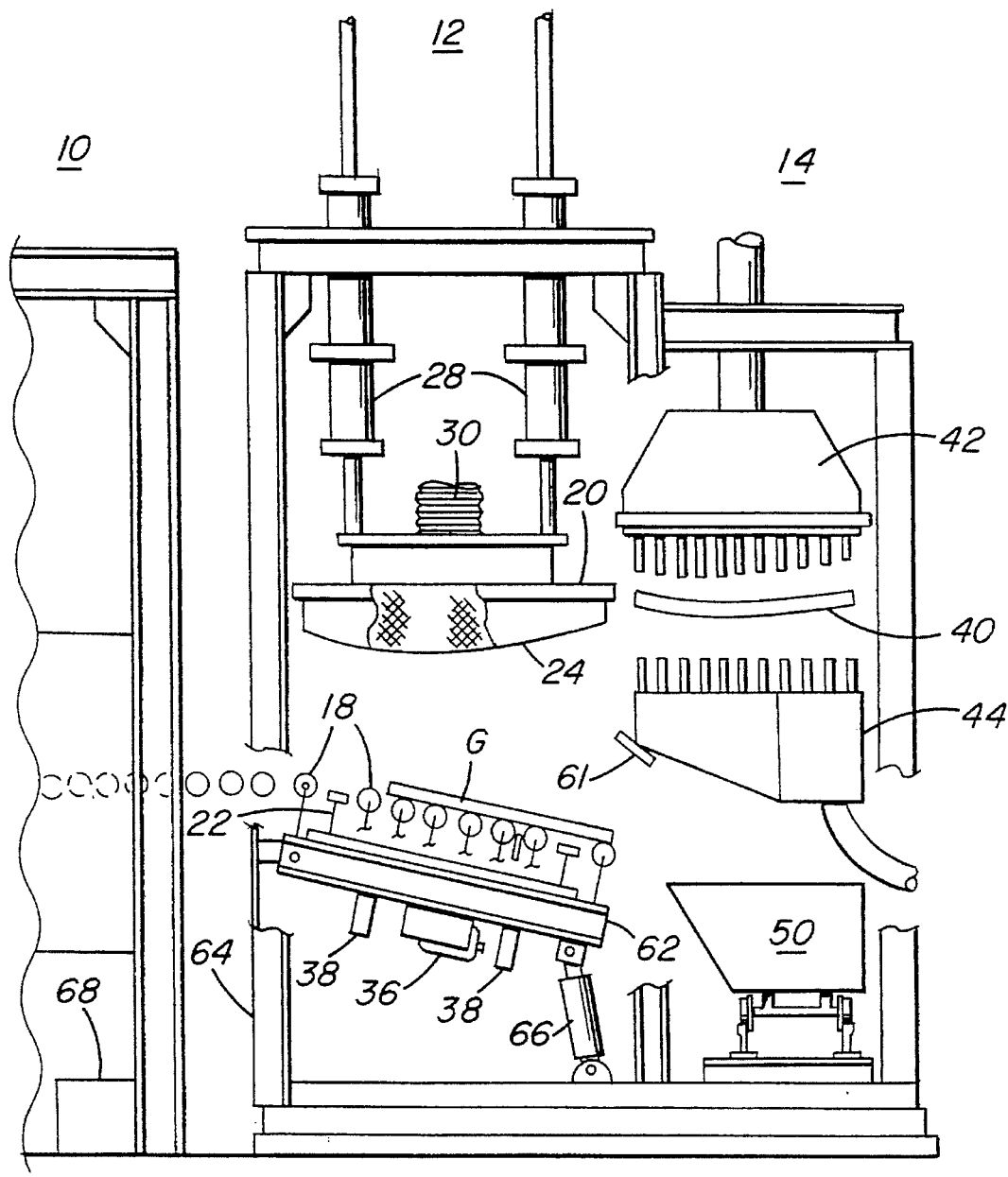
FIG. 4 is a side elevation of the pivoting support frame illustrated in a lowered, or dump, position.

Although not limiting in the present invention, in the particular embodiment shown in FIG. 1, the lower ring mold 22, drive 36, alignment rods 38 and conveyor rolls 18 are all mounted on a pivoting frame 62. The frame 62 is pinned to a supporting structure 64 and cylinder 66 moves the frame 62 between an up, or run, position as shown in FIG. 1 wherein the glass is expected to be shaped by the upper mold 20 and lower ring 22, and a lower, or dump, position as shown in FIG. 4 wherein the glass runs off the rolls 18 and is dumped directly into hopper 50. This capability has particular utility when the operator knows in advance the glass sheets G are not going to be shaped. For example, in the event the furnace must be cleared of glass, the conveying rate of the glass through the furnace may be increased. However, since the glass will not be in the furnace long enough to reach its heat softening temperature, it will tend not to sag downward to the extent that it would if it was at a higher temperature. By lowering the frame 62 to its downward position, the operator can ensure that the glass will properly transfer through the shaping station 12 and be dumped into the collection hopper 50 without contacting any portion of the lower quench arrangement.

In operation, when there is unexpected failure in the system, e.g. the molds don't operate, the frame 62 remains in its up position as shown in FIG. 1 and the glass sheet G progresses through shaping station 12 and into hopper 50. Because the glass is at its heat softening temperature, the glass will sag once it is no longer supported by the rolls 18 and be deposited in the hopper 50. In the event that the operator knows in advance that the glass sheets are to be removed without shaping, the top press 20 may be retracted upward and frame 62 pivoted downward to its dump position to better transfer the glass sheets G from shaping station 12 into hopper 50. A controller 68 may be used in combination with a plurality of sensors 70 within the furnace 10 and shaping station 12 to monitor the movement and alignment of the glass sheet G through the furnace 10 and shaping station 12 and the operation of the mold 20 and ring 22 so that if it is required, frame 62 may be automatically lowered to its dump position as the glass sheets G are conveyed through the shaping station 12 and into hopper 50. Controller 68 would also indicate the undesirable situation to the operator.

Other variations as are known to those of skill in the art may be resorted to without departing from the scope of the invention as defined by the claims that follow.

We claim:

1. In a method of heating, shaping and cooling heat softenable sheet material including the steps of moving a sheet in a first direction along a first generally horizontal plane through a furnace to heat said sheet to its heat softening temperature and into a shaping station, shaping said sheet including the steps of engaging said sheet with an upper vacuum surface, drawing a vacuum along said upper vacuum surface to secure said sheet thereagainst, moving a ring member from a first position between upper and lower quench plenums in a cooling station to a second position within said shaping station beneath said upper vacuum surface, along a second generally horizontal plane in a direction which is linearly aligned with said first direction, and terminating said vacuum along said upper vacuum surface to deposit said sheet on said ring member, and cooling said sheet including the step of moving said ring member from said second position within said shaping station along said second plane to said first position within said cooling station, the improvement comprising the steps of:

vertically offsetting said second plane relative to said first plane such that said first plane is beneath a portion of said lower quench plenum which is immediately adjacent said shaping station;

conveying said sheet within said shaping station along said first plane over a series of rolls supported on a frame positioned below said upper vacuum surface;

monitoring operation of said sheet moving, conveying, and shaping steps and in response to improper operation of said sheet moving, conveying, or shaping steps;

continuing said conveying step while pivoting said frame downward such that said sheet is conveyed through and exits said shaping station under said adjacent portion of said lower quench plenum without being shaped.

2. The method as in claim 1 further including the step of depositing said sheet in a collector positioned beneath said adjacent portion of said lower quench plenum.

3. The method as claim 1 wherein said monitoring step includes the steps of monitoring the position of said sheet during said sheet moving and conveying steps and in response to improper positioning of said sheet, initiating said continued conveying step.

4. The method as in claim 1 further including the steps of positioning lifting means within said shaping station to lift said sheet into c with upper said vacuum surface and wherein said monitoring step further includes the steps of monitoring operation of said lifting means and in response to improper operation of said lifters, initiating said continued conveying step.

5. The method as in claim 4 further including the step of providing said lifting means with a sheet shaping surface generally corresponding to a corresponding portion of said upper vacuum surface.

6. The method as in claim 1 wherein said monitoring step further includes the steps of monitoring movement of said ring member and in response to improper movement of said ring member, initiating said continued conveyed step.

7. In an apparatus for heating, shaping and cooling heat softenable sheet material including a conveying means to move a sheet in a first direction along a first generally horizontal plane through a furnace to heat said sheet to its heat softening temperature and into a shaping station, an upper vacuum mold positioned within said shaping station, a ring member moveable between a first position within said shaping station beneath said upper vacuum mold to a second position between upper and lower quench plenums within a cooling station, along a second generally horizontal plane in a direction which is linearly aligned with said first direction, the improvement comprising:

a series of conveyor rolls supported on a frame positioned below said upper vacuum mold to convey said sheet along said first plane while within said shaping station; and means to pivot said frame downward to lower a leading edge of said sheet while said sheet is conveyed through and exits said shaping station, wherein said first plane is vertically offset from said second plane such that said first plane is beneath a portion of said lower quench plenum which is immediately adjacent said shaping station.

8. The apparatus as in claim 7 further including a controller to monitor operation of said upper vacuum mold and said ring member and the orientation and position of said sheet within said furnace and shaping station and to allow continued conveyance of said sheet through and out said shaping station.

9. The apparatus as in claim 7 further including a collector positioned beneath said adjacent portion of said lower quench plenum.

10. The apparatus as in claim 7 wherein said adjacent portion of said lower quench plenum has a tapered cross-section.

11. The apparatus as in claim 7 further including lifting means positioned within said shaping station and beneath said upper vacuum mold to lift said sheet into contact with said upper vacuum mold.

12. The apparatus as in claim 11 wherein said lifting means include a sheet shaping surface generally corresponding to a corresponding portion of a sheet engaging surface of said upper vacuum mold.

13. The apparatus as inn claim 12 wherein said sheet engaging surface of said upper vacuum mold has a curved configuration.

14. In a method of heating, shaping and cooling heat softenable sheet material including the steps of moving a sheet in a first direction through a furnace to heat said sheet to its heat softening temperature and into a shaping station, shaping said sheet including the steps of engaging said sheet with an upper vacuum surface, drawing a vacuum along said upper vacuum surface to secure said sheet thereagainst, moving a ring member from a first position between upper and lower quench plenums in a cooling station to a second position within said shaping station beneath said upper vacuum surface, in a direction which is generally linearly aligned with said first direction and terminating said vacuum along said upper vacuum surface to deposit said sheet on said ring member, and cooling said sheet including the step of moving said ring member from said second position within said shaping station to said first position within said cooling station, the improvement comprising the steps of:

conveying said sheet within said shaping station over a series of rolls supported on a frame positioned below said upper vacuum surface;

monitoring operation of said sheet moving, conveying, and shaping steps and in response to improper operation of said sheet moving, conveying or shaping steps;

continuing said conveying step while pivoting said frame downward such that said sheet is conveyed through and exits said shaping station under a portion of said lower quench plenum adjacent said shaping station without being shaped; and depositing said sheet into a collector.

15. In an apparatus for heating, shaping and cooling heat softenable sheet material including a conveying means to move a sheet in a first direction through a furnace to heat said sheet to its heat softening temperature and into a shaping station, an upper vacuum mold positioned within said shaping station, a ring member moveable between a first position within said shaping station beneath said upper vacuum mold to a second position between upper and lower quench plenums within a cooling station, in a direction which is generally linearly aligned with said first direction, the improvement comprising:

a series of conveyor rolls supported on a frame position below said upper vacuum mold to convey said sheet within said shaping station;

means to pivot said frame downward to lower a leading edge of said sheet while said sheet is conveyed through and exits said shaping station, wherein said sheet may be conveyed through said shaping station and beneath a portion of said lower quench plenum which is immediately adjacent said shaping station; and a collector positioned adjacent said shaping station and beneath said lower quench plenum to receive said sheet.

* * * * *

UNITED STATES PATENT AND TRADEMARK OFFICE
CERTIFICATE OF CORRECTION

PATENT NO. : 5,470,366
DATED : November 28, 1995
INVENTOR(S) : Robert G. Frank and James H. Schwartz It is certified that error appears in the above-identified patent and that said Letters Patent is hereby corrected as shown below:

Claim 4, column 6, line 55, delete "c" and insert --contact-- and delete "upper said" and insert --said upper--;

line 58, delete "lifters" and insert --lifting means--;

Claim 13, column 7, line 44, delete "inn" and insert --in--.

Signed and Sealed this

Twenty-fifth Day of November, 1997

*Attest:*

BRUCE LEHMAN

*Attesting Officer*  *Commissioner of Patents and Trademarks*